United States Patent
Mathy

(10) Patent No.: US 8,235,863 B2
(45) Date of Patent: Aug. 7, 2012

(54) DEVICE WITH A LIQUID RESERVOIR FOR THE GROWING OF A SURFACE

(75) Inventor: Bernard Mathy, Bellignat (FR)

(73) Assignee: A.B.M. Plastic (FR)

( * ) Notice: Subject to any disclaimer, the term of this patent is extended or adjusted under 35 U.S.C. 154(b) by 406 days.

(21) Appl. No.: 12/664,492

(22) PCT Filed: Jun. 11, 2008

(86) PCT No.: PCT/FR2008/000798
§ 371 (c)(1),
(2), (4) Date: Dec. 22, 2009

(87) PCT Pub. No.: WO2009/007539
PCT Pub. Date: Jan. 15, 2009

(65) Prior Publication Data
US 2010/0162623 A1    Jul. 1, 2010

(30) Foreign Application Priority Data
Jun. 19, 2007   (FR) .................................. 07 04357

(51) Int. Cl.
*A01G 25/00* (2006.01)
(52) U.S. Cl. .......................................... 477/79; 47/65.9
(58) Field of Classification Search ................ 47/65.9, 47/66.5, 73, 75, 79
See application file for complete search history.

(56) References Cited

U.S. PATENT DOCUMENTS

| | | | | |
|---|---|---|---|---|
| 4,887,388 A | * | 12/1989 | Waltel, Jr. | 47/79 |
| 4,926,586 A | * | 5/1990 | Nagamatsu | 47/65.9 |
| 5,419,080 A | * | 5/1995 | Buss et al. | 47/87 |
| 6,253,487 B1 | * | 7/2001 | Yoshida et al. | 47/33 |
| 2007/0130828 A1 | * | 6/2007 | Mathy | 47/65.9 |
| 2009/0260282 A1 | * | 10/2009 | Hashimoto et al. | 47/20.1 |
| 2009/0260284 A1 | * | 10/2009 | Barbalho | 47/65.9 |
| 2010/0162623 A1 | * | 7/2010 | Mathy | 47/65.9 |

FOREIGN PATENT DOCUMENTS

| | | |
|---|---|---|
| DE | 102005023413 A1 | 11/2006 |
| FR | 2703213 A1 | 10/1993 |
| FR | 2851419 A1 | 8/2004 |
| FR | 2884107 A1 | 10/2006 |

OTHER PUBLICATIONS

International Search Report PCT/FR2008/000798; Dated Jan. 29, 2009.

* cited by examiner

*Primary Examiner* — Frank T Palo
(74) *Attorney, Agent, or Firm* — Cantor Colburn LLP

(57) ABSTRACT

A device having a tray defining at least one reservoir designed to contain a liquid, a platform, designed to be placed on the tray and to support a growing substrate, the platform including a flat main portion provided with wells having, at the bottom, an orifice communicating with the liquid contained in the tray, and means for carrying liquid in the reservoir, where a plurality of reinforcing walls protrude perpendicularly upwards from the main portion of the platform, where these walls have sufficient height so that, when the platform is placed on the tray, their top edge forms the highest portion of the device, and where the reinforcing walls are distributed on the surface of the platform so as to allow a distribution of the loads applied to this device.

10 Claims, 4 Drawing Sheets

DEVICE WITH A LIQUID RESERVOIR FOR THE GROWING OF A SURFACE

TECHNICAL FIELD

The present invention relates to a device with a liquid reservoir for the growing of a surface.

Such a device makes it possible to grow grass or various plants while limiting the quantity of water necessary. It may in particular be used in arid regions despite the very high evaporation due to the heat, and even if the layer of arable soil is thin. The liquid is usually water or water mixed with various products such as fertilizers.

BACKGROUND

The known devices with liquid reservoir typically comprise a tray having a bottom wall and side walls, defining at least one reservoir designed to contain a liquid, and a platform, designed to be placed on the tray and to support a growing substrate, the platform comprising a substantially flat main portion provided with at least one well the bottom of which comprises at least one orifice capable of communicating with the liquid contained in the tray.

Document FR 2 851 419 describes a first example of a device of this type, provided, in particular, with ribs delimiting the breakage zones. Document FR 2 884 107 proposes a second example of such a device, which also comprises means for carrying liquid in the reservoir, arranged at least partially on the platform and separate from the orifice of the well, making it possible to limit even further the amount of liquid used for growing the surface in question.

In practice, the surface to be cultivated is covered with these devices placed side by side, and then a layer of appropriate material, such as sand, is placed on the platforms. The latter operation is carried out by small machines which move by rolling on the water-reservoir devices while pouring out the sand. Then, bigger earth-moving machines, that can weigh up to 3 or 4 tons, level the layer of sand thus deposited to obtain the desired configuration of the land.

The earth-moving machines running on the layer of sand does not cause damage to the water-holding devices, that latter being well covered by the sand. However, the sand-pouring operation carried out by the small machines may cause the devices to break.

Specifically, for matters of installation time, in particular when it involves equipping large areas, such as a stadium for example, the small machines have to run on the water-reserve devices even when they pour out the sand. The layer of sand may therefore be thin, or even non-existent, when these machines pass, which may lead to the devices breaking.

BRIEF SUMMARY

The disclosure provides a device with a liquid reservoir having sufficient mechanical strength to allow small machines to run directly on this device, thereby allowing a considerable laying rate.

Accordingly, the invention relates to a device with a liquid reservoir for the growing of a surface, comprising:

a tray having a bottom wall and side walls, defining at least one reservoir designed to contain a liquid;

a platform, designed to be placed on the tray and to support a growing substrate, the platform comprising a main portion that is substantially flat provided with at least one well the bottom of which comprises at least one orifice capable of communicating with the liquid contained in the tray;

means for carrying liquid in the reservoir, arranged at least partially on the platform and separate from the orifice of the well.

According to a general definition of the invention, the platform comprises a plurality of reinforcing walls, separate from the liquid-carrying means and protruding substantially perpendicularly upwards from the main portion of the platform, the said reinforcing walls having sufficient height so that, when the platform is placed on the tray in the position of use, the top edge of the reinforcing walls forms the highest portion of the device with a liquid reservoir, and the reinforcing walls being distributed on the surface of the main portion of the platform so as to allow a distribution of the loads applied to the said device with a liquid reservoir.

Thus, a machine moving on the water-holding devices does not run directly on the main flat portion of the platform, which it would risk breaking, but on the top edges of the reinforcing walls. The distribution of these walls is such that the load of the machine, and therefore the forces arising therefrom, are not located in a reduced zone of the platform but by contrast distributed over the surface of the main portion of the platform. For this reason, the mechanical strength of the water-holding device is considerably increased and the risks of breakage are virtually nil.

Consequently, a small machine laying sand can run with no particular precaution on the devices placed on the surface to be cultivated. The time necessary for the installation of these devices and the layer of sand covering them is greatly reduced, which allows the use of these devices for large surface areas.

The reinforcing walls are usually arranged in the vicinity of the edges of the main portion of the platform and/or in the central portion of the main portion of the platform. When the dimensions of the device are relatively large, it may be necessary to provide not only reinforcing walls in the vicinity of the edges of the main portion of the platform, but also at a distance from these edges in order to prevent a machine from running directly on the central portion of the main portion of the platform.

According to one possible embodiment, the device comprises a first series of reinforcing walls parallel with one another and a second series of reinforcing walls parallel with one another and perpendicular to the reinforcing walls of the first series, the reinforcing walls defining between them substantially rectangular cavities on the surface of the main portion of the platform. It is these cavities that will be filled with sand, at least up to the top edge of the reinforcing walls. For example, the platform may comprise a well in the centre of each cavity.

It is also possible to have the platform also comprise, in at least one cavity (and for example in all the cavities), at least one reinforcing wall extending on the diagonal of the said cavity. In one or each cavity, it is possible to have two reinforcing walls each extending on a distinct diagonal of the cavity. If the centre of the cavity is occupied by a well, the reinforcing wall or walls extend from a corner of the cavity to a corner of the well and do not therefore extend over the whole length of the diagonal.

According to one possible embodiment, the device also comprises at least one drainage channel which, arranged in the tray, extends from one edge to another of the tray and is open at its two ends, the said channel having side walls substantially perpendicular to the bottom wall of the tray which have at least one zone lower than the side walls of the tray in order to allow the surplus liquid to run from the reservoir(s) to the channel.

By virtue of this feature, the surplus liquid does not run out of the tray (for example into the adjacent tray or into the ground), but into the drainage channel. By connecting the open ends of the channels of two adjacent trays, it is possible to produce a drainage network allowing recovery of the excess liquid in a manifold. The invention therefore makes it possible to prevent the formation of a sheet of stagnant water on the surface to be cultivated. This finds a particularly worthwhile application with turfed surfaces provided on tramway lines, because the presence of surface water risks causing malfunctions of the electrical systems on the ground.

It should be noted that the presence of a drainage channel in the tray and of the reinforcing walls on the platform are features that can be provided independently of one another on a device with a liquid reservoir.

Advantageously, the device may comprise two perpendicular drainage channels, forming four reservoirs in the device. This finds its application when the devices cover a surface that is not flat, the drainage then not being fully effective unless the water is collected in two perpendicular directions of flow. This is the case in particular with golf courses and more particularly the greens.

If there are two drainage channels, one may have its ends closed off. This is then the equivalent of having only one drainage channel, the advantage being that it is possible, with a single mould, to produce devices with a single effective channel or with two channels.

Each of the side walls of the channel may be formed by an undulation of the bottom wall of the tray defining a furrow on the bottom side of the tray. This geometry gives a certain flexibility for the tray, so that the devices can deform elastically in order to adapt to the reliefs of the land.

The top edge of at least one side wall of the channel may comprise at least one bearing member for the platform. It may, for example, be bearing posts evenly distributed over each of the side walls of the or each channel. This promotes the retention of the platform by preventing it from sinking relative to the tray.

BRIEF DESCRIPTION OF THE DRAWINGS

As non-limiting examples, several possible embodiments of the invention will now be described with reference to the appended figures.

DETAILED DESCRIPTION

Figure 1:
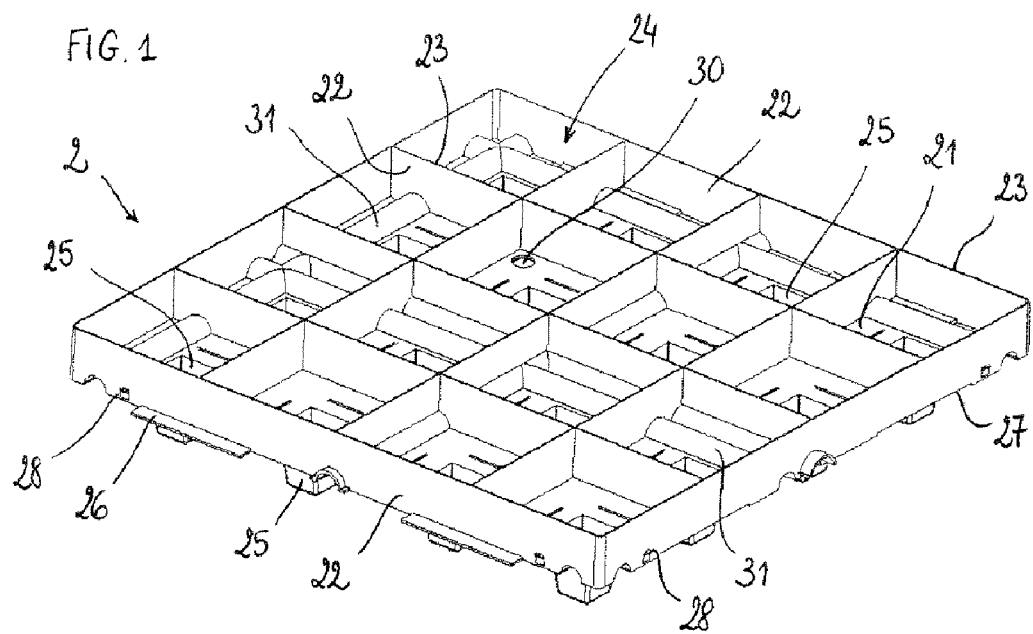
FIG. 1 is a view in perspective of the platform of a liquid reservoir device according to a first embodiment of the invention.

The liquid reservoir device comprises a tray 1 designed to be placed on a surface to be cultivated and a platform 2 designed to be placed on the tray 1 and to support a growing substrate. The tray 1 and the platform 2 are for example made of a moulded plastic.

The tray 1 has a rectangular or square shape. It comprises a bottom wall 3 and four side walls 4. Arranged in the tray 1 are two drainage channels 5 each parallel with a side wall 4, perpendicular to one another, and having a common central portion. The drainage channels 5 therefore form a cross and define, in the tray 1, four large, substantially identical reservoirs 7. In each of these reservoirs 7 there are also placed in a cross four partitions 6 which thus define four substantially identical reserve cells 8, that can communicate with one another.

Each channel 5 extends from one edge to another of the tray 1 and has two side walls 9 substantially perpendicular to the bottom wall 3 of the tray 1, having a height that is substantially identical to the height of the side walls 4 of the tray 1. Each side wall 9 is formed by an undulation of the bottom wall 3 of the tray 1 defining a furrow 10 on the bottom side of the tray 1. Therefore, a side wall 9 comprises two substantially parallel faces 11 and one top rim 12 that is substantially flat and parallel to the bottom wall 3. The four furrows 10 thus arranged in the bottom wall 3 confer on the tray 1 a capacity to withstand flexing in order to adapt to the reliefs of the land on which it will be placed.

Each side wall 9 of the drainage channel 5 has, facing each of the reserve cells 8, a notch 13 formed by a localized depression in the top rim 12. The bottom of this notch 13 is therefore lower than the top edge of the side wall 4 of the tray 1. Therefore, the surplus water in the cells 8 preferably flows into the drainage channels 5 and not out of the tray 1.

Moreover, supporting posts 14 are arranged on the top rim 12 of each side wall 9 of the drainage channel 5, at a distance from the notches 13, in order to interact with the bottom face of the platform 2.

Figure 2:
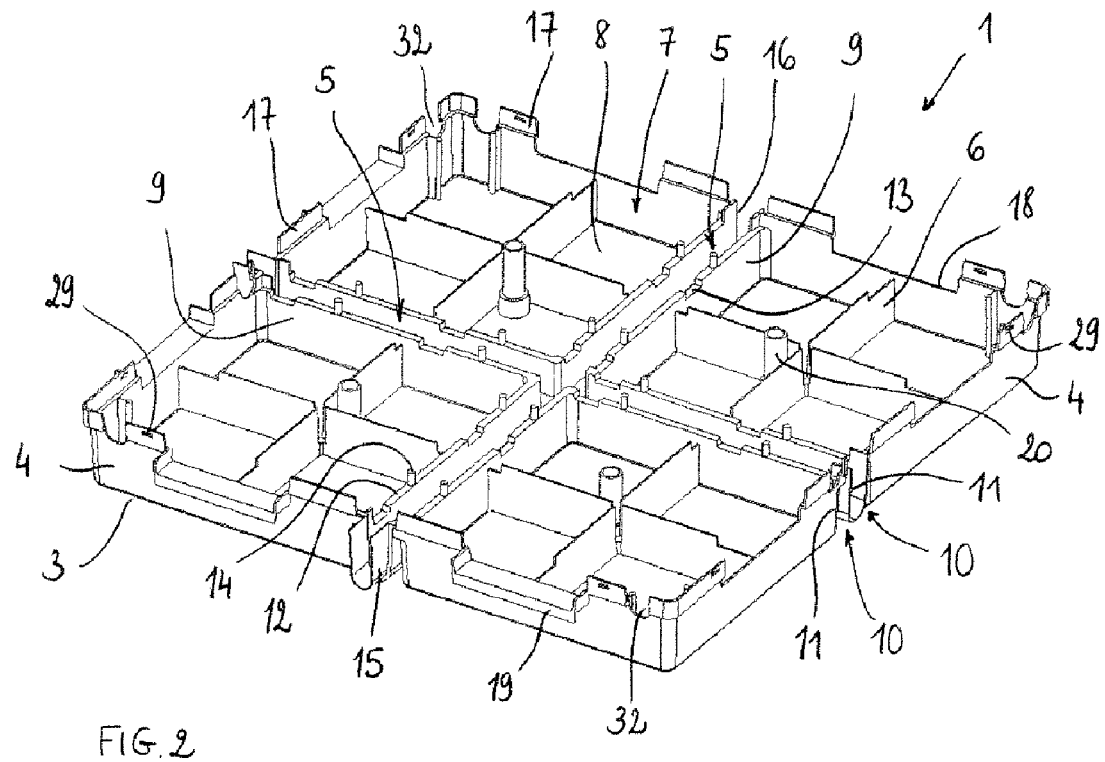
FIG. 2 is a view in perspective of the tray of a liquid reservoir device according to a first embodiment of the invention.
Figure 3:
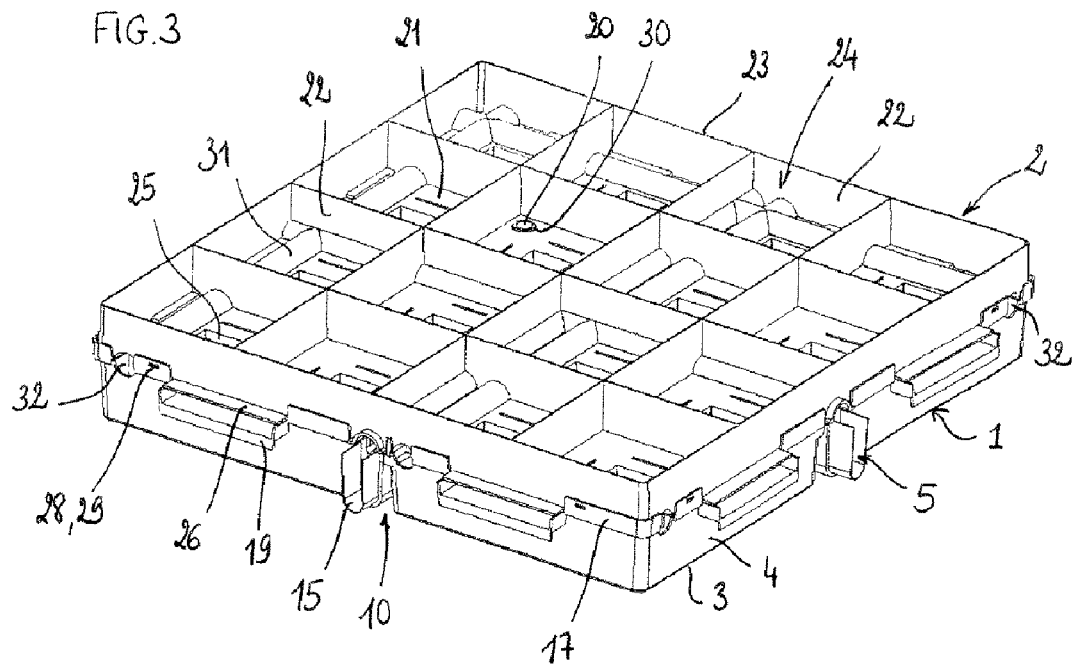
FIG. 3 is a view in perspective of the platform of FIG. 1 mounted on the tray of FIG. 2.

In the embodiment of FIGS. 1 to 3, each drainage channel 5 is open at its two ends. A first end 15 is of the male type, while the second end 16 is of the female type, so that it is possible to connect the drainage channels 5 of two adjacent trays 1 and thus form an excess water collection network.

Lugs 17 protrude upwards in the extension of the side walls 4 of the tray 1. Moreover, certain side walls 4 comprise notches 18 while other side walls 4 comprise protruding coupling means 19 designed to interact with the notches 18 of an adjacent tray 1 for linking together two trays 1 removably.

Finally, the tray 1 comprises stacks 20 which in this instance have a substantially cylindrical shape and extend perpendicularly to the bottom wall 3 over substantially the whole height of the tray 1. Each stack 20 leads at its first end into the bottom wall 3, forming a circular hole, and, at its second end, beneath the platform 2. In the embodiment shown, one stack 20 is provided for each reservoir 7, placed against a corner formed by the partitions 6, but other arrangements are possible.

The platform 2 comprises a substantially flat main portion 21 with a shape and dimensions adapted to those of the tray 1. From this main portion 21 there protrudes perpendicularly upwards a plurality of reinforcing walls 22. The latter are distributed in a first series of reinforcing walls 22 parallel to a first side of the platform 2 and a second series of reinforcing walls 22 perpendicular to the walls of the first series. In each series, there are, on the one hand, two reinforcing walls 22 each arranged in the vicinity of an edge of the main portion 21 of the platform 2 and, on the other hand, several (in this instance three) reinforcing walls 22 arranged in the central portion of the main portion 21 of the platform 2. The reinforcing walls 22 in this instance extend from one edge to the other of the platform 2.

The reinforcing walls 22 all have the same height, so that their top edges 23 are included in one and the same plane parallel to the main portion 21. The reinforcing walls 22 are preferably fairly thin. The height of the reinforcing walls 22 may be of the order of 3 to 5 cm.

The reinforcing walls 22 thus define between them substantially rectangular cavities 24 on the surface of the main portion 21 of the platform 2. In the embodiment shown, the reinforcing walls 22 are evenly distributed over the platform 2 so that the cavities 24 are substantially identical.

Arranged at the centre of each cavity 24 is a well 25 extending downwards, the bottom wall of which is provided with an orifice (not visible). Each well 25 is designed to be placed in a reserve cell 8 when the platform 2 is mounted on the tray 1.

Certain side edges of the platform 2 comprise lugs 26 protruding in the extension of the flat portion 13 while other side edges have notches 27. These are means for additional connection of platforms 2 mounted on adjacent trays 1.

When the platform 2 is placed on the tray 1, the reinforcing walls 22 situated near the edges of the main portion 21 of the platform 2 are housed on the inside and against the lugs 17 of the tray 1. In addition, studs 28 protruding outwards from these reinforcing walls 22 are inserted in slots 29 arranged in these lugs 17. This gives a good positioning and a good hold of the platform 2 relative to the tray 1. In this mounted position, the main portion 21 of the platform 2 rests on the posts 14, which prevents it from collapsing. The platform 2 also comprises orifices 30 arranged to each be opposite the second end of a stack 20, in the mounted position.

The platform 2 comprises means making it possible to carry the liquid in the reservoirs 7, preferably directly, that is to say without the liquid passing through the substrate, in which a large portion of the liquid could evaporate without reaching either the plant or one of the reservoirs 7.

In the embodiment illustrated in the figures, these means for carrying liquid in the reservoir 7 comprise at least one groove 31 arranged on the platform 2, open downward, and in which a duct can be clipped, usually reversibly. This duct comprises for example a plurality of small holes allowing the liquid to pass through to the reservoir 7 of the drop-by-drop type.

A groove 31 typically has a semicircular section, open at its two ends and open downwards, substantially in the plane of the main portion 21.

The or each groove 31 is made of the same material as the platform 2 and protrudes upwards. However, its height is lower than that of the reinforcing walls 22 (for example less than half as high), so that the top edges 23 of these reinforcing walls 22 form the highest point of the platform 2 mounted on a tray 1, hence of the liquid-holding device.

For example, the platform comprises several grooves 31, placed close to an edge of the platform 2 or rather in the middle of the latter, the grooves 31 being able to be parallel to or perpendicular to one another. In this way it is possible to create, with adjacent devices, the desired liquid distribution network.

Arranged in the lugs 17 of the tray 1 are apertures 32 facing the grooves 31 for the passage of the ducts which will rest on the partitions 6 and the top rim 12 of the side walls 9 of the drainage channels 5. It is possible to have two ducts overlapping in the device, each placed in a groove 31.

Figure 6:
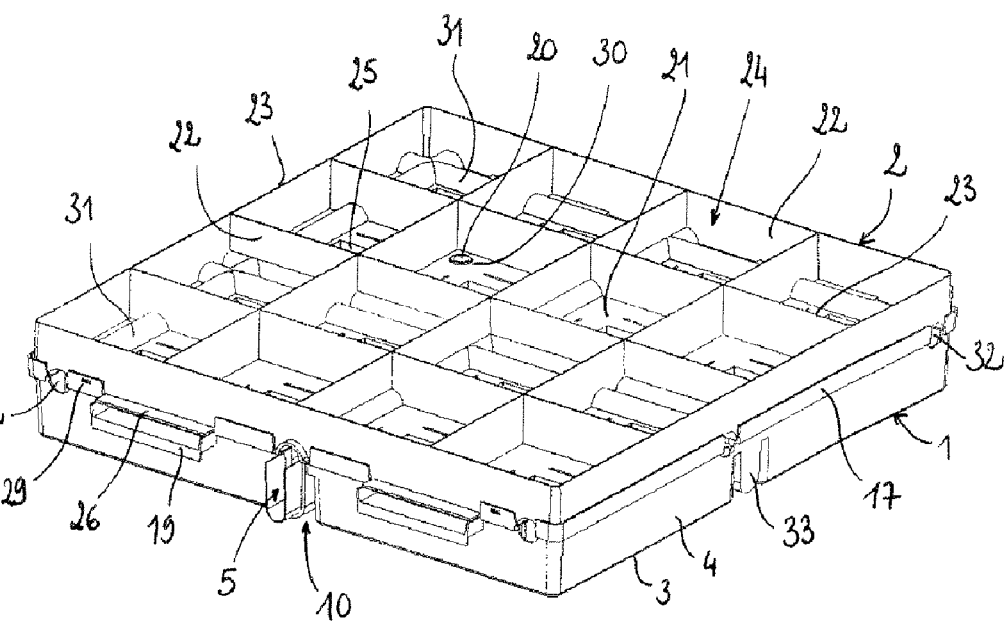
FIGS. 4 to 6 are views similar to FIGS. 1 to 3, respectively, illustrating a second embodiment of the device with a liquid reservoir of the invention.
Figure 4:
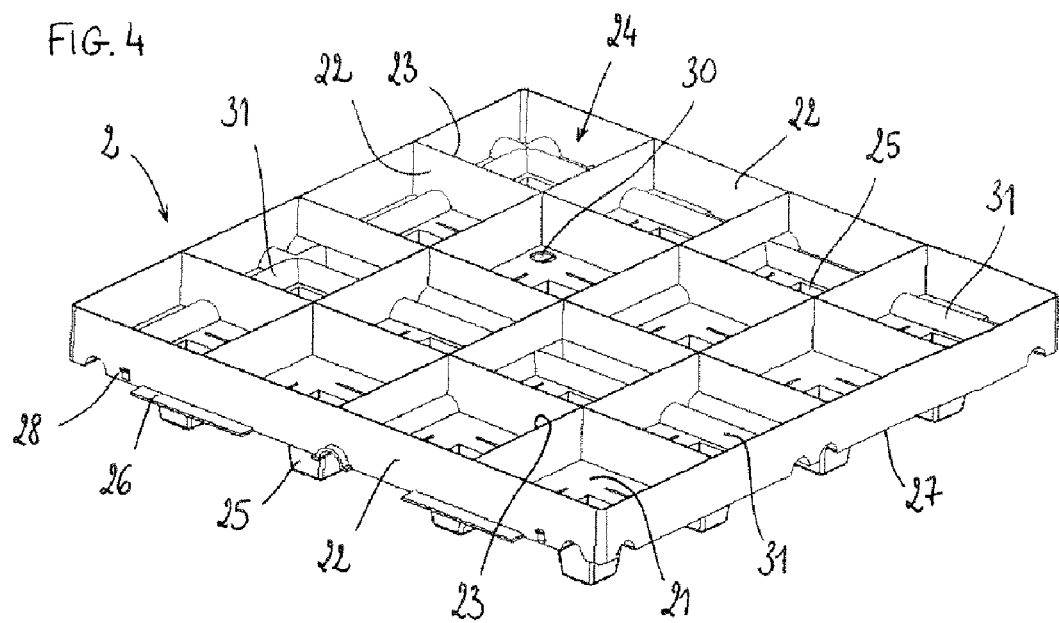
Figure 5:
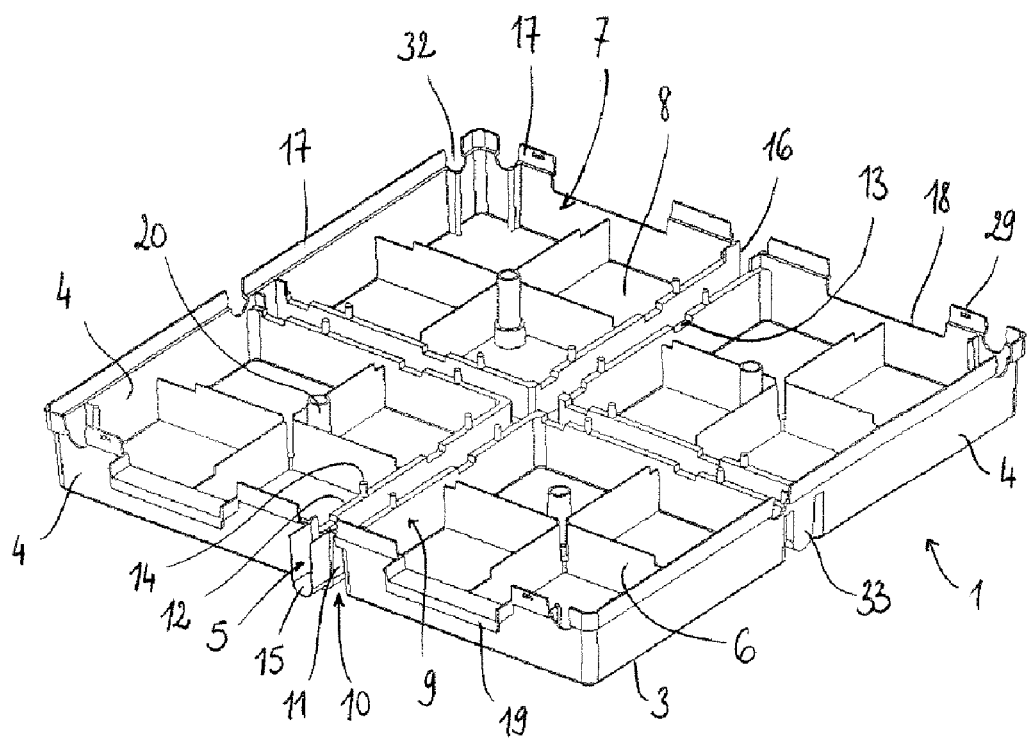
Figure 7:
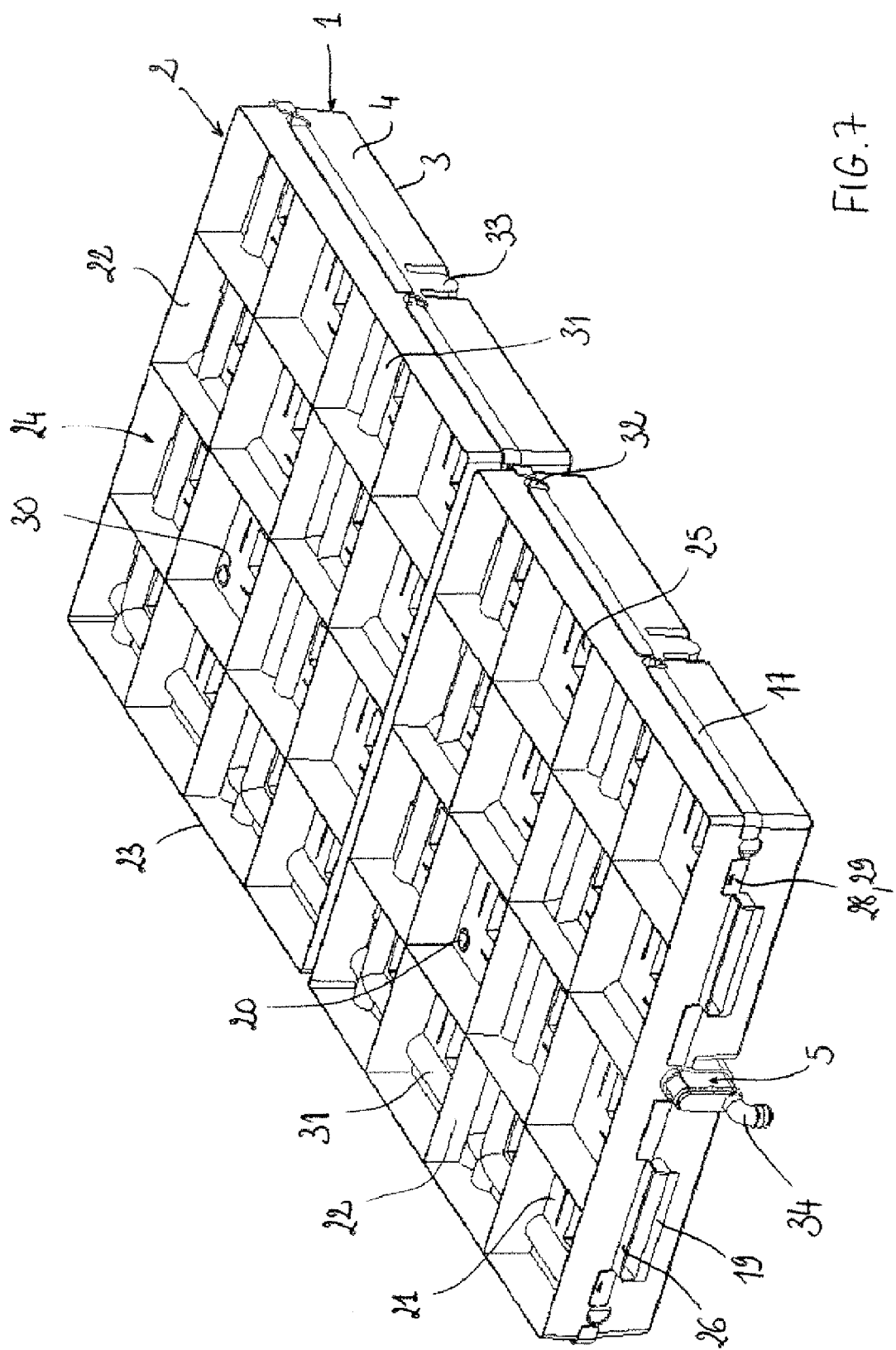
FIG. 7 is a view in perspective of two adjacent devices, according to the second embodiment of the invention.

According to a second embodiment illustrated in FIGS. 4 to 6, two drainage channels 5 are provided, but one of them has ends closed off by an element 33 parallel to the corresponding side wall 4 of the tray 1. Thus, there is only one effective drainage channel 5.

In practice, the trays 1 are placed side by side on the surface to be cultivated and linked together by the above-described means. If appropriate, because of the presence of an obstacle, one or more trays 1 can be cut. The pipes provided with small holes are then clipped into the adjacent platforms 2 according to a predetermined configuration and the platforms 2, cut if necessary, are mounted on the trays 1 in order to form the liquid-holding devices. The pipes are designed to be connected to a water supply system and the drainage channel(s) 5, connected together, are designed to be connected to one or two manifolds, by means for example of an elbow connector 34.

A machine can then run on these devices in order to pour out sand, without risking breaking the platforms 2 or the trays 1, because of the presence of the reinforcing walls 2. Then, the sand is leveled by bigger machines. Other layers of materials may be placed on top of the sand, as required, in order to form an appropriate growing substrate.

In operation, the water is carried by the pipes clipped into the grooves 31 and then falls drop by drop directly into the reservoirs 7, from which the plant may take the quantity of water that it needs via the wells 25.

Therefore, the invention provides decisive improvement to the prior art, by supplying a particularly strong device with a liquid reservoir which therefore makes it possible to use it in the context of equipping large surface areas to be cultivated.

It goes without saying that the invention is not limited to the embodiments described above as examples, but that, in contrast, it covers all the variant embodiments thereof.

The invention claimed is:

1. Device with a liquid reservoir for growing of a surface, comprising:
    a tray having a bottom wall and side walls, defining at least one reservoir designed to contain a liquid;
    a platform, designed to be placed on the tray and to support a growing substrate, the platform comprising a main portion that is substantially flat provided with at least one well the bottom of which comprises at least one orifice capable of communicating with the liquid contained in the tray;
    means for carrying liquid in the reservoir, arranged at least partially on the platform and separate from the orifice of the well;
    wherein the platform comprises a plurality of reinforcing walls, separate from the liquid carrying means and protruding substantially perpendicularly upwards from the main portion of the platform, said reinforcing walls having sufficient height so that, when the platform is placed on the tray in a position of use, a top edge of the reinforcing walls forms a highest portion of the device with a liquid reservoir, and the reinforcing walls being distributed on a surface of the main portion of the platform so as to allow a distribution of loads applied to said device with a liquid reservoir.

2. Device according to claim 1, wherein the reinforcing walls are arranged near edges of the main portion of the platform and/or in a central portion of the main portion of the platform.

3. Device according to claim 1, further comprising a first series of reinforcing walls parallel with one another and a second series of reinforcing walls parallel with one another and perpendicular to the reinforcing walls of the first series, the reinforcing walls defining between them substantially rectangular cavities on the surface of the main portion of the platform.

4. Device according to claim 3, wherein the platform comprises, in at least one cavity, at least one reinforcing wall extending along a diagonal of the said cavity.

5. Device according to claim 1, further comprising at least one drainage channel which, arranged in the tray, extends from one edge to another of the tray and is open at two ends, the channel having side walls substantially perpendicular to the bottom wall of the tray which have at least one zone lower than the side walls of the tray in order to allow surplus liquid to run from the reservoir to the channel.

6. Device according to claim 5, further comprising two perpendicular drainage channels, forming four reservoirs in the device.

7. Device according to claim 6, wherein one of the drainage channels has ends that are closed off.

8. Device according to claim 5, wherein each of the side walls of the channel is formed by an undulation of the bottom wall of the tray defining a furrow on the bottom side of the tray.

9. Device according to claim 5, wherein the top edge of at least one side wall of the channel comprises at least one bearing member for the platform.

10. Device according to claim 1, wherein the liquid carrying means in the reservoir comprise at least one groove arranged on the platform, open in a downward direction, and in which a duct can be clipped.

* * * * *